(12) United States Patent
Anselment

(10) Patent No.: US 9,804,356 B2
(45) Date of Patent: Oct. 31, 2017

(54) FOCUS ADJUSTMENT APPARATUS FOR AN IMAGE DETECTION SYSTEM

(71) Applicant: SICK AG, Waldkirch (DE)

(72) Inventor: Christoph Anselment, Waldkirch (DE)

(73) Assignee: SICK AG, Waldkirch (DE)

( * ) Notice: Subject to any disclaimer, the term of this patent is extended or adjusted under 35 U.S.C. 154(b) by 143 days.

(21) Appl. No.: 14/868,420

(22) Filed: Sep. 29, 2015

(65) Prior Publication Data

US 2016/0097913 A1 Apr. 7, 2016

(30) Foreign Application Priority Data

Oct. 6, 2014 (EP) .................................... 14187799

(51) Int. Cl.
*G02B 7/04* (2006.01)
*G02B 7/08* (2006.01)

(52) U.S. Cl.
CPC ...................................... *G02B 7/08* (2013.01)

(58) Field of Classification Search
CPC ............... G02B 7/04; G02B 7/08; G02B 7/09
See application file for complete search history.

(56) References Cited

U.S. PATENT DOCUMENTS

| 5,319,498 | A | * | 6/1994 | Hara | ......................... | G02B 7/08 359/824 |
| 5,377,048 | A | | 12/1994 | Tada et al. | | |
| 2008/0136267 | A1 | * | 6/2008 | Laabs | ................... | G01C 15/002 310/80 |

FOREIGN PATENT DOCUMENTS

| DE | 101 60 587 A1 | 6/2003 | |
| DE | 10 2011 117 743 A1 | 7/2012 | |
| EP | 2 075 488 A1 * | 7/2008 | ............. F16H 25/22 |
| EP | 2 075 488 A1 | 7/2009 | |
| EP | 2 498 113 A1 | 9/2012 | |
| EP | 2 498 113 B1 | 3/2013 | |
| WO | 2006/074695 A1 | 7/2006 | |
| WO | 2008/010151 A2 | 1/2008 | |

OTHER PUBLICATIONS

Search Report issued in European application No. 14 18 7799 dated Mar. 23, 2015.

* cited by examiner

*Primary Examiner* — Joseph P Martinez
(74) *Attorney, Agent, or Firm* — Nath, Goldberg & Meyer; Jerald L. Meyer

(57) ABSTRACT

To achieve a compact construction shape with a long service life, a focus adjustment apparatus for an image detection system is provided which comprises an objective having at least one lens and which comprises a motor device for the positional adjustment of the objective, wherein the lens is provided on a movable lens holder, wherein the movable lens holder is connected to a threaded unit of the motor device via a support unit provided in the movable lens holder such that the support unit can be rolled with the lens holder along a main axis of the threaded unit in accordance with a rotation of the threaded unit and such that an axis of rotation of the support unit is directed perpendicular to the main axis of the threaded unit.

7 Claims, 3 Drawing Sheets

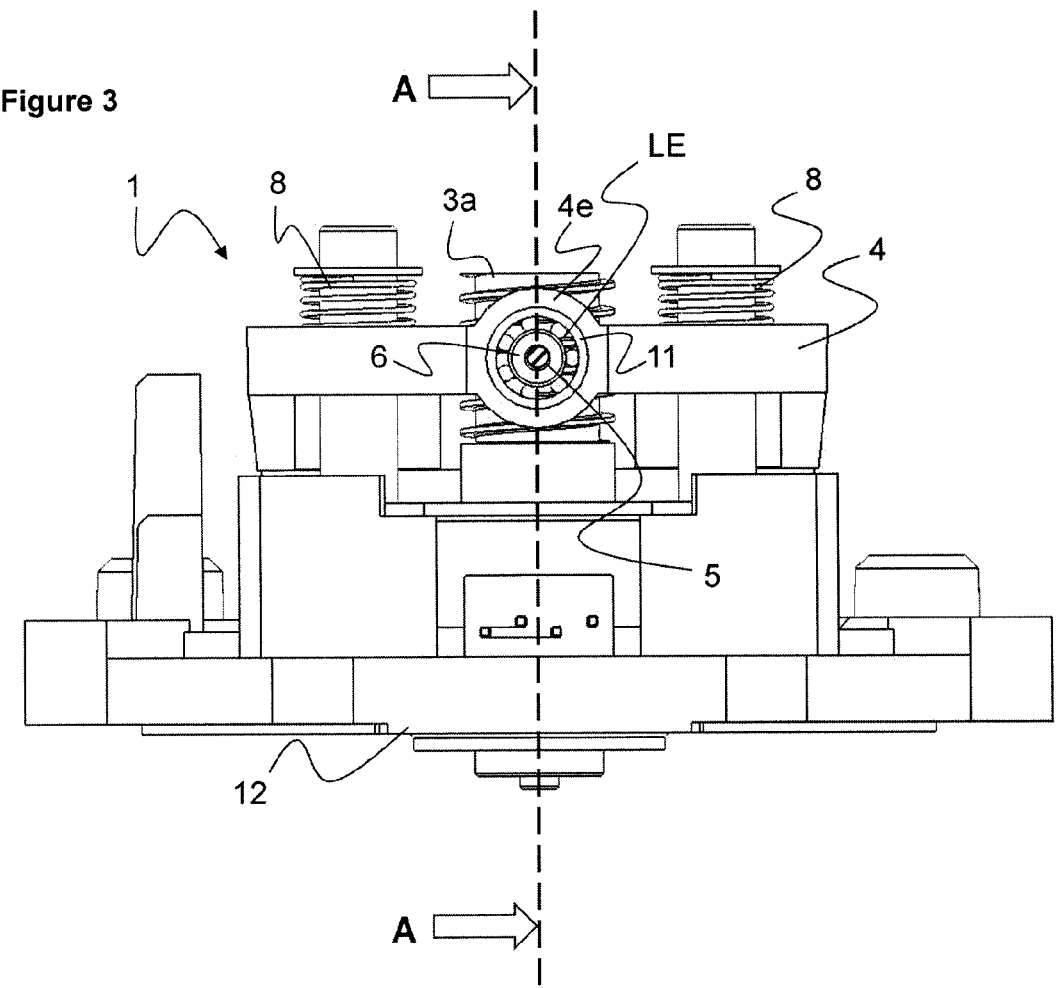

Figure 1:
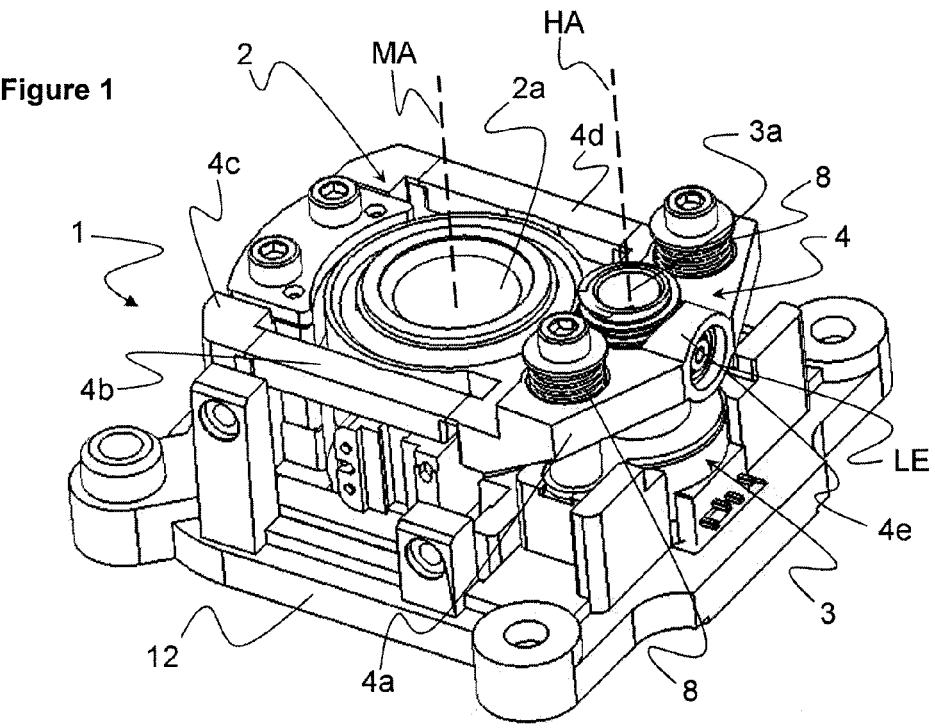

Figure 4   Section A - A
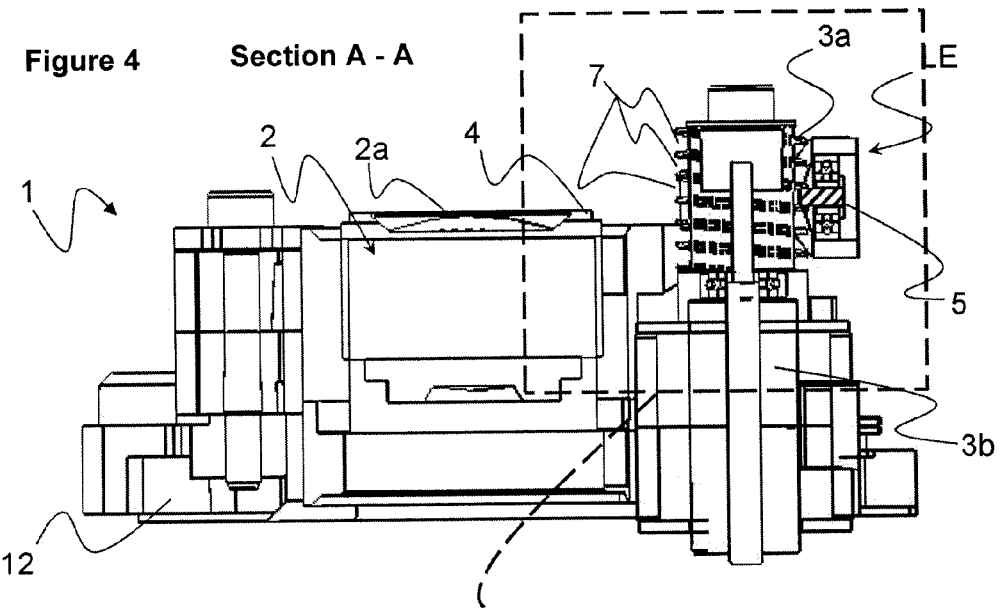
Figure 4a
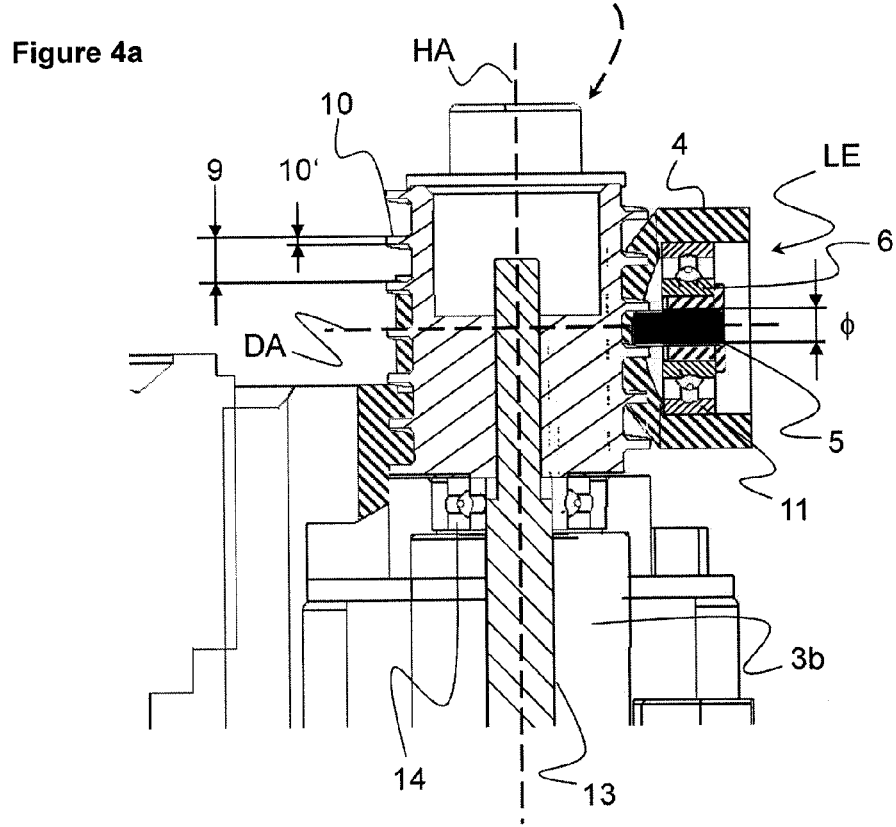

FOCUS ADJUSTMENT APPARATUS FOR AN IMAGE DETECTION SYSTEM

The invention relates to a focus adjustment apparatus for an image detection system which comprises an objective having at least one lens and which comprises a motor device for the positional adjustment of the objective, wherein the lens is provided on a movable lens holder.

Image detection systems are increasingly also used in today's industry to detect optical codes such as barcodes or matrix codes or to detect zones to be monitored. In this process, an image of the code or of the environment is taken and the image data are subsequently read out using digital image processing.

These image detection systems have a focus adjustment to take images with a sharp focus over a required working region. It is usually connected to an autofocus with which the spacing from the object to be taken is determined and the focal position is adjusted accordingly.

A focus adjustment device for an image detection system, in particular for a code reader, of the named kind is known from EP 2 498 113 B1. The image detection system comprises an objective having at least one lens and comprises a motor device for the positional adjustment of the objective, wherein the lens is provided on a movable lens holder.

In this respect, the lens holder is supported in a parallel guide which is connected to the motor device via a coupling unit. The lens holder is moved along the parallel device by means of a cam disk which is driven by the motor device, whereby the position of the objective is adjusted with a parallel displacement of the objective plane.

The parallel displacement of the lens holder by the cam disk allows a fast movement of the objective into a required focal position without generating aberrations in so doing.

It is an object of the present invention to modify a focus adjustment apparatus for an image detection system of the initially named kind such that a small and integrated construction shape with a long service life can be achieved.

The object is satisfied in accordance with the invention by a focus adjustment apparatus for an image detection system which comprises an objective having at least one lens and which comprises a motor device for the positional adjustment of the objective, wherein the lens is provided on a movable lens holder, and wherein the movable lens holder is connected to a threaded unit of the motor device via a support unit provided in the movable lens holder such that the support unit can be rolled with the lens holder along a main axis of the threaded unit in accordance with a rotation of the threaded unit and such that an axis of rotation of the support unit is directed perpendicular to the main axis of the threaded unit.

In accordance with a preferred embodiment, the support unit comprises a cylindrical pin, with the cylindrical pin being provided in an inner ring of the support unit coaxial with the axis of rotation of the support unit and projecting into a thread turn of the threaded unit.

This has the advantage that the cylindrical pin can roll along the thread turn of the threaded unit without any sliding friction such that the lens holder can be moved in accordance with the rotation of the threaded unit.

In accordance with a further preferred embodiment, the cylindrical pin projects unilaterally from the support unit into the threaded unit such that the focus adjustment apparatus can advantageously be given a compact design.

In accordance with a preferred embodiment, the cylindrical pin furthermore has a defined diameter such that the cylindrical pin can be rolled in the thread turn of the threaded unit. Only marginal rolling friction hereby results between the cylindrical pin and the thread turn of the threaded unit so that the service life of the focus adjustment device can be considerably increased.

In accordance with a further preferred embodiment, two springs press the support unit in the direction of the threaded unit. The cylindrical pin advantageously has a defined freedom from play and a defined contact.

In accordance with a further preferred embodiment, the support unit furthermore comprises a ball bearing, a pin bearing, a cylindrical bearing or the like.

In accordance with a further preferred embodiment, the threaded unit comprises a threaded spindle.

The focus adjustment apparatus in accordance with the invention can hereby be manufactured inexpensively due to the use of standard components.

In accordance with a further preferred embodiment, the threaded unit furthermore has a defined thread pitch and a support surface of the thread with a defined thickness. The thread pitch less the thickness of the support surface of the thread advantageously defines the thread turn of the threaded unit, wherein the thread turn is larger than the defined diameter of the cylindrical pin.

In accordance with a further preferred embodiment, the motor device furthermore comprises a motor unit which is arranged coaxial to the threaded unit and which rotates the threaded unit.

The apparatus in accordance with the invention can be designed in a similar manner by further features and shows similar advantages in this respect. Such further features are described in an exemplary, but not exclusive manner in the dependent claims following the independent claims.

Figure 2:
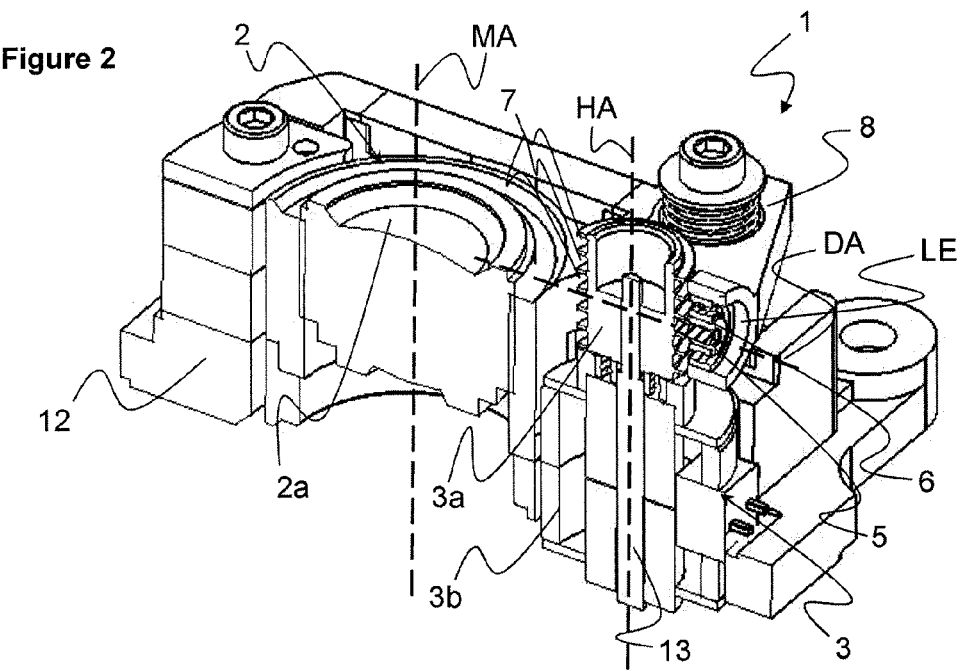

The invention will also be explained in the following with respect to further advantages and features with reference to the enclosed drawing and to embodiments. The Figures of the drawing show in:

FIG. 1 a 3D representation of a focus adjustment apparatus in accordance with the invention;

FIG. 2 a sectional view of the 3D representation of the focus adjustment apparatus in accordance with the invention;

FIG. 3 a side view of the support unit in accordance with the invention of the focus adjustment apparatus in accordance with the invention;

FIG. 4 a sectional view of the focus adjustment apparatus in accordance with the invention along the sectional plane A-A; and FIG. 4a a detailed view of the support unit in accordance with the invention.

FIGS. 1 to 4a show different views of a preferred embodiment of a focus adjustment apparatus 1 in accordance with the invention for an image detection system which adjusts the position of an objective 2 having at least one lens 2a. In all the Figures, the same reference numerals designate the same features.

No details of the image detection system and of the objective 2 will be explained since the focus adjustment apparatus 1 in accordance with the invention is suitable for different image detection systems, such as code readers or camera sensors, having different objectives 2 with a different number of lenses 2a, diaphragms and other customary optical elements of an objective 2.

FIG. 1 shows a 3D representation of the focus adjustment apparatus 1 in accordance with the invention which is mounted on a base plate 12 for fastening in the image detection system.

The objective 2 having at least one lens 2a and a motor device 3 for the positional adjustment of the objective 2 are mounted on the base plate 12. The lens 2a is provided on a lens holder 4 which is movable with respect to the base plate 12. The motor device 3 comprises a threaded unit 3a and a motor unit 3b, wherein the threaded unit 3a is rotatably driven by the motor unit 3b and the threaded unit 3a and the motor unit 3b are arranged coaxial with respect to one another.

The threaded unit 3a and the motor unit 3b thus have a common main axis HA, wherein the motor device 3 is mounted on the base plate 12 such that the main axis HA of the motor device 3 is aligned in parallel with a center axis MA of the objective 2 or of the lens 2a of the image detection system.

The lens holder 4 has a parallelepiped shape which comprises four side parts 4a to 4d. The side part 4c of the lens holder 4 disposed opposite the motor device 3 is fixedly mounted to the base plate 12 by means of screws. The side part 4a disposed at the side of the motor device 3 has a cylindrical section 4e in which a support unit LE is arranged.

Two springs 8 and 8 are provided at the fastening screws of the side part 4a having the cylindrical section 4e and press the support unit LE in the direction of the threaded unit 3a.

The support unit LE connects the movable lens holder 4 to the threaded unit 3a of the motor device 3 such that the support unit LE can be rolled with the lens holder 4 along the main axis HA of the threaded unit 3a in accordance with a rotation of the threaded unit 3a. I.e. the support unit LE rolls with the lens holder 4, with respect to the base plate 12, toward or away from the base plate 12 by a corresponding rotation of the threaded unit 3a. In this respect, an axis of rotation DA of the support unit LE is directed perpendicular to the main axis HA of the threaded unit 3a such that the rolling movement of the support unit LE effects a translatory movement of the lens holder 4 along the main axis HA of the threaded unit 3a.

A sectional view of the focus adjustment apparatus 1 in accordance with the invention, as shown in FIG. 1, is shown in FIG. 2.

It can be recognized from this that the axis of rotation DA of the support unit LE is oriented perpendicular to the main axis HA of the motor device 3 or to the center axis MA of the objective 2 such that the support unit LE is rollable or movable in parallel with the main axis HA.

The threaded unit 3a furthermore preferably comprises a threaded spindle and the support unit LE preferably comprises a cylindrical pin 5, wherein the cylindrical pin 5 is provided in an inner ring 6 of the support unit LE coaxial with the axis of rotation DA of the support unit LE and projects into a thread turn 7 of the threaded unit 3a.

The cylindrical pin can roll along the thread turn of the threaded unit without sliding friction due to the projection of the cylindrical pin 5 into the thread turn 7 of the threaded unit 3a such that the lens holder can be moved in accordance with the rotation of the threaded unit.

The cylindrical pin 5 furthermore projects unilaterally from the support unit LE into the threaded unit 3a such that a compact design of the focus adjustment apparatus 1 is possible.

The motor unit 3b of the motor device 3 is connected to the threaded spindle of the threaded unit 3a via a shaft 13. The threaded spindle is caused to rotate about the main axis HA of the motor device 3 by a driving of the motor unit 3b.

Since the cylindrical pin 5 has a defined diameter φ and since the thread turn 7 is larger than the defined diameter φ of the cylindrical pin 5, the cylindrical pin 5 can roll in the thread turn 7 or along the thread turn 7 such that the cylindrical pin 5 moves together with the support unit LE and the lens holder 4 in parallel with the main axis HA of the motor device 3.

This movement effects a positional change of the lens 2a, whereby the focus of the objective 2 can be changed.

FIG. 3 shows a side view of the focus adjustment apparatus 1 in accordance with the invention in which in particular the support unit LE is looked at. The support unit LE can comprise a ball bearing, a pin bearing, a cylindrical bearing or the like, wherein an outer ring 11 of the bearing unit LE is pressed onto the cylindrical section 4e of the lens holder 4. The cylindrical pin 5 is pressed into the inner ring 6 of the support unit LE.

FIG. 4 shows a sectional view of the focus adjustment apparatus 1 in accordance with the invention along the plane A-A shown in FIG. 3. In particular the spiral shape of the thread turn 7 of the threaded spindle of the threaded unit 3a can be seen from this, with the cylindrical pin 5 of the support unit LE projecting into the thread turn 7.

The support unit LE can, as shown in the Figure, move upward or downward by rotating the threaded spindle of the threaded unit 3a by means of the motor unit 3b since the cylindrical pin 5 rolls off along the spiral thread turn 7 in accordance with the rotation which a conveying direction predefines.

On this upward or downward movement of the support unit LE, the lens holder 4 connected to the support unit LE is moved away from the base plate 12 or toward the base plate 12 on the side of the motor device 3, whereby a change of focus is achieved without tilting the objective 2.

The threaded unit 3a, in particular the thread turn 7, has a support surface 10 of the thread with a defined thickness 10' on which the cylindrical pin 5 lies or rolls off. The threaded unit 3a furthermore has a defined thread pitch 9 such that an adjustment of the focus of the objective 2 can be predefined in dependence on the defined thread pitch 9. I.e. the larger the thread pitch 9 is, the faster the focus of the objective 2 can be adjusted, as with a small thread pitch 9, with the same rotation of the threaded unit 3a. The smaller the thread pitch 9 is, the finer the focus of the objective 2 can be set.

The thread turn 7 of the threaded unit 3a is thus defined over the thread pitch 9 less the thickness 10' of the support surface 10 of the thread. As shown in FIG. 4a, the thread turn 7 of the threaded unit 3a is larger than the defined diameter φ of the cylindrical pin 5 such that the cylindrical pin 5 can roll without sliding friction in the thread turn 7 of the threaded unit 3a.

The threaded unit 3a is supported on the motor unit 3b via bearings 14 and is connected to the motor unit 3b without play by the shaft 13. The cylindrical pin 5 is supported in the inner ring 6 of the support unit LE and the outer ring 11 of the support unit LE is connected to the lens holder 4.

All the adjustments of the focus of the objective 2 thus take place by rolling movements of the corresponding components of the focus adjustment apparatus 1 in accordance with the invention. Sliding friction phenomena are thereby avoided so that the service life of the focus adjustment apparatus 1 in accordance with the invention is substantially increased.

REFERENCE NUMERAL LIST 1 focus adjustment apparatus
2 objective
2a lens 3 motor device
3a threaded unit
3b motor unit
4 lens holder
4a-4d side parts of the lens holder
4e cylindrical section
5 cylindrical pin
6 inner ring
7 thread turn
8 spring
9 thread pitch
10 support surface
10' thickness of the support surface
11 outer ring
12 base plate
13 shaft
14 bearing of the motor device
DA axis of rotation
HA main axis
LE support unit
MA center axis
φ thickness of the cylindrical pin

The invention claimed is:

1. A focus adjustment apparatus for an image detection system, the focus adjustment apparatus comprising an objective having at least one lens, wherein the lens is provided on a movable lens holder, and a motor device for the positional adjustment of the objective, characterized in that the movable lens holder is connected to a threaded unit of the motor device via a support unit provided in the movable lens holder such that the support unit can be rolled with the lens holder along a main axis of the threaded unit in accordance with a rotation of the threaded unit and such that an axis of rotation of the support unit is directed perpendicular to the main axis of the threaded unit, wherein the support unit comprises a cylindrical pin, wherein the cylindrical pin is provided in an inner ring of the support unit coaxial with the axis of rotation of the support unit and projects into a thread turn of the threaded unit, and wherein the threaded unit has a defined thread pitch corresponding to a predefined adjustment of the focal point and a support surface of the thread, on which the cylindrical pin rests or rolls, with a defined thickness, and two springs press the support unit in the direction of the threaded unit along the main axis.

2. The focus adjustment apparatus in accordance with claim 1, wherein the cylindrical pin projects unilaterally from the support unit into the threaded unit.

3. The focus adjustment apparatus in accordance with claim 1, wherein the cylindrical pin has a defined diameter such that the cylindrical pin can be rolled in the thread turn of the threaded unit.

4. The focus adjustment apparatus in accordance with claim 1, wherein the support unit comprises a ball bearing, a pin bearing, a cylindrical bearing.

5. The focus adjustment apparatus in accordance with claim 1, wherein the threaded unit comprises a threaded spindle.

6. The focus adjustment apparatus in accordance with claim 1, wherein the thread pitch less the thickness of the support surface of the thread defines the thread turn of the threaded unit, wherein the thread turn is larger than the defined diameter of the cylindrical pin.

7. The focus adjustment apparatus in accordance with claim 1, wherein the motor device comprises a motor unit which is arranged coaxial to the threaded unit and which rotates the threaded unit.

* * * * *